(12) United States Patent
Lennen

(10) Patent No.: US 11,333,770 B2
(45) Date of Patent: May 17, 2022

(54) DETECTION AND MITIGATION OF FALSE GLOBAL NAVIGATION SATELLITE SYSTEM TRACKS IN THE PRESENCE OF LOCALLY GENERATED INTERFERENCE

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd

( * ) Notice: Subject to any disclaimer, the term of this patent is extended or adjusted under 35 U.S.C. 154(b) by 618 days.

(21) Appl. No.: 16/190,966

(22) Filed: Nov. 14, 2018

(65) Prior Publication Data

US 2020/0064490 A1 Feb. 27, 2020

Related U.S. Application Data

(60) Provisional application No. 62/721,844, filed on Aug. 23, 2018.

(51) Int. Cl.
*G01S 19/21* (2010.01)
*G01S 19/29* (2010.01)

(52) U.S. Cl.
CPC .............. *G01S 19/21* (2013.01); *G01S 19/29* (2013.01)

(58) Field of Classification Search
CPC ........ G01S 19/21; G01S 19/29; H04B 1/7097
See application file for complete search history.

(56) References Cited

U.S. PATENT DOCUMENTS

| 7,605,753 | B2 * | 10/2009 | Landmark .............. G01S 19/21 342/357.59 |
| 8,022,869 | B2 * | 9/2011 | Wu ........................ G01S 19/21 342/357.63 |
| 8,390,513 | B2 | 3/2013 | Young |
| 9,008,249 | B2 * | 4/2015 | Wu ....................... H04B 1/1036 375/350 |
| 9,065,686 | B2 * | 6/2015 | Sun ....................... H04B 1/1027 |
| 2004/0156425 | A1 * | 8/2004 | Manz ..................... G01S 19/21 375/150 |
| 2005/0285781 | A1 * | 12/2005 | Park ........................ H04K 3/90 342/357.48 |
| 2014/0132446 | A1 | 5/2014 | Lennen |
| 2016/0306049 | A1 | 10/2016 | Tangudu et al. |

FOREIGN PATENT DOCUMENTS

ER 1862816 3/2013

* cited by examiner

*Primary Examiner* — Cassi J Galt
(74) *Attorney, Agent, or Firm* — The Farrell Law Firm, P.C.

(57) ABSTRACT

An electronic device, method and system for global navigation satellite system (GNSS) are herein disclosed. The electronic device includes an antenna configured to receive a satellite vehicle (SV) signal, and a processor configured to determine a carrier-to-noise density ratio (CNO) of the SV signal, compare the determined CNO of the SV signal with a threshold, and identify whether the SV signal is a true SV signal or a false SV signal when the determined CNO is less than the threshold.

10 Claims, 12 Drawing Sheets

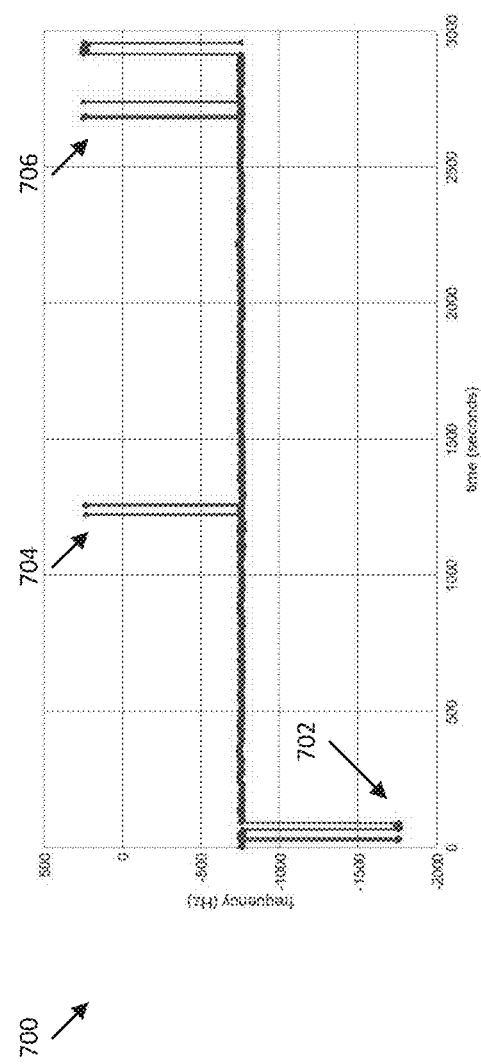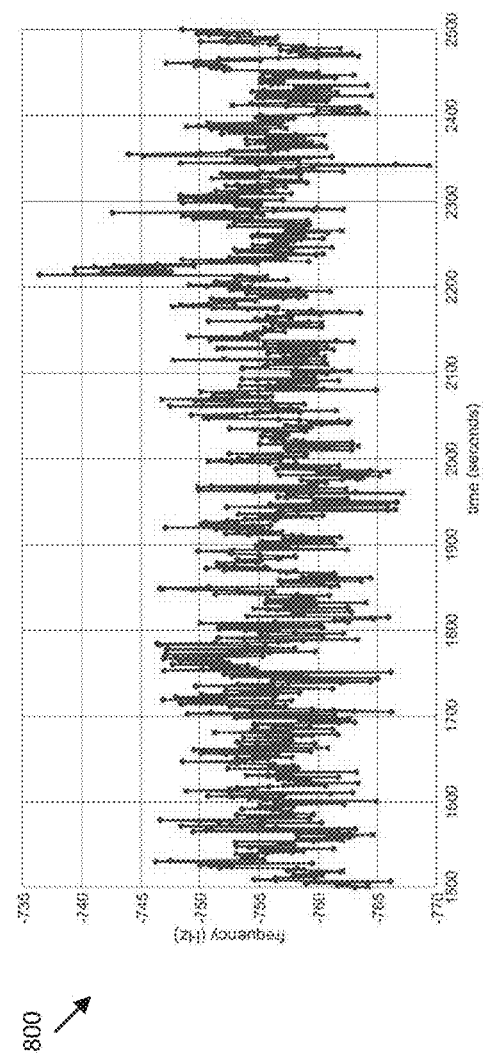
FIG. 7
FIG. 8

DETECTION AND MITIGATION OF FALSE GLOBAL NAVIGATION SATELLITE SYSTEM TRACKS IN THE PRESENCE OF LOCALLY GENERATED INTERFERENCE

PRIORITY

This application is based on and claims priority under 35 U.S.C. § 119(e) to a U.S. Provisional patent application filed on Aug. 23, 2018 in the United States Patent and Trademark Office and assigned Ser. No. 62/721,844, the entire contents of which are incorporated herein by reference.

FIELD

The present disclosure relates generally to a method and system for detection of false global navigation satellite system (GNSS) tracks.

BACKGROUND

An interference scenario exists in global navigation satellite systems (GNSS) where the platforms also include other radios (and therefore, other radio signals). Examples include long-term evolution (LTE) band 13 and 14 second harmonic interference, as well as other locally generated synchronous interference sources.

Modern multi-radio platforms may use a single temperature compensated crystal oscillator (TCXO) or other crystal oscillators (XO) as the source drive for all clock and local oscillators. This leads to locally generated interference that remains fixed in frequency with respect to the oscillator frequency. An example is when multiple false satellite vehicle (SV) lock points are observed at n×1 kHz+XHz, where X is around 240 Hz. One characteristic is that the carrier lock is stable in frequency and does not drift with respect to the XO drift, satellite Doppler, etc.

In addition, the existence of multiple carrier wave (CW) tones leads to the resulting correlation function (e.g., correlating with a locally generated C/A code) being indistinguishable from that of a true SV correlation. The correlation waveform may be the same each millisecond (or the C/A code repeat rate) such that the interference correlation accumulates each millisecond.

SUMMARY

According to one embodiment, an electronic device for a global navigation satellite system (GNSS) is provided. The electronic device includes an antenna configured to receive a satellite vehicle (SV) signal, and a processor configured to determine a carrier-to-noise density ratio (CNO) of the SV signal, compare the determined CNO of the SV signal with a threshold, and identify whether the SV signal is a true SV signal or a false SV signal when the determined CNO is less than the threshold According to one embodiment, a method for a GNSS is provided. The method includes receiving an SV signal by an antenna, determining an average carrier frequency of the SV signal, and identifying whether the SV signal is a true SV signal or a false SV signal by running a coherent search algorithm (CSA).

According to one embodiment, an electronic device for a GNSS is provided. The electronic device includes an antenna configured to receive a SV signal and a processor configured to determine a carrier frequency of the SV signal, compare the determined carrier frequency with a look-up table that includes values associated with carrier frequencies or lock points of false SV signals for a model or type of the electronic device, identify whether the SV signal is a true SV signal or a false SV signal when the determined carrier frequency matches a value in the look-up table.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 7 is a graph depicting an example carrier frequency of a false SV track, according to an embodiment;

FIG. 8 is a graph depicting an example carrier frequency of a false SV track over time, according to an embodiment;

DETAILED DESCRIPTION

Figure 1:
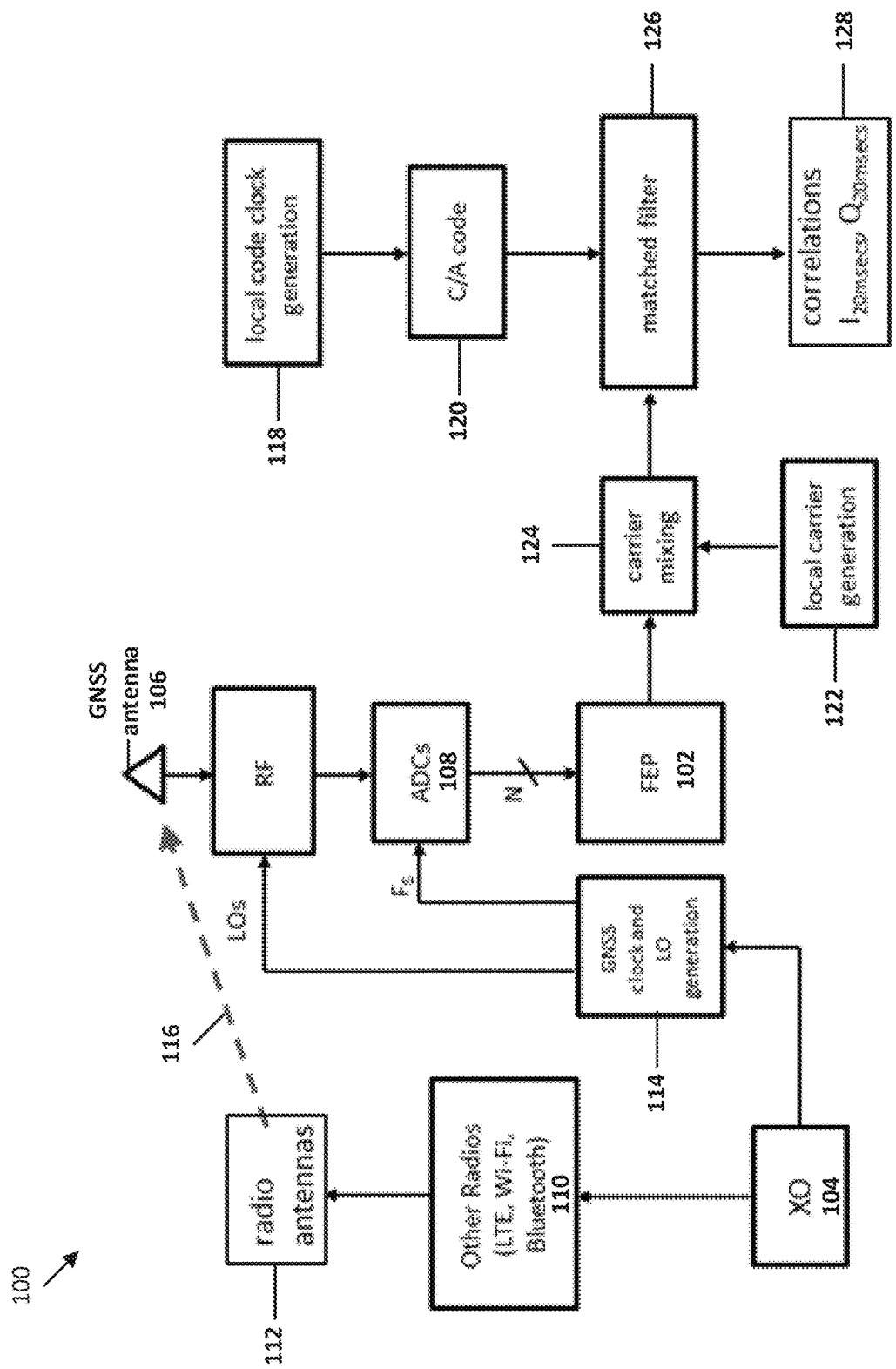
FIG. 1 is a diagram of an electronic device 100, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

In mobile electronic devices (e.g., mobile devices, portable electronics, automotive systems, etc.), global navigation satellite system (GNSS) signals, such as satellite vehicle (SV) signals, sent to and from mobile devices are utilized for, among other features, location and position tracking. The GNSS signals typically include data to be processed by the devices for location and position tracking purposes. However, as the mobile electronic devices are capable of and utilized for a variety of functions and applications, additional non-GNSS signals are transmitted to and sent from the electronic devices. Often, these non-GNSS signals are translated by the electronic device as a true SV signal, resulting in inaccurate and incorrect location tracking of the electronic device. Thus, provided herein are systems, methods, and devices for identifying and distinguishing false SVs from true SVs.

FIG. 1 is a diagram of an electronic device 100, according to an embodiment.

Referring to FIG. 1, aspects of the electronic device 100 are depicted in both representative hardware form and representative operations performed by the electronic device 100.

The electronic device 100 includes a front end processor (FEP) 102, a crystal oscillator (XO) 104, a GNSS antenna 106, analog-to-digital converters (ADC) 108, other radios (e.g., LTE, Wi-Fi, Bluetooth, etc.) 110 and antennas 112 associated with the other radios 110. In operation, the electronic device 100 receives an SV signal via antenna 106, and then utilizes GNSS clock and local oscillation (LO) 114 from the XO 104 to identify/translate the SV signal. However, interference 116 generated by the radio antennas 112 of the other radios 110 result in false SVs being received at the GNSS antenna 106. Thus, as is described in detail herein, the electronic device 100 may be configured to utilize local code clock generation 118 and C/A code 120, along with local carrier generation 122 and carrier mixing 124, in combination with a matched filter 126 to determine correlations 128 between I and Q for detecting false SVs.

Figure 2:
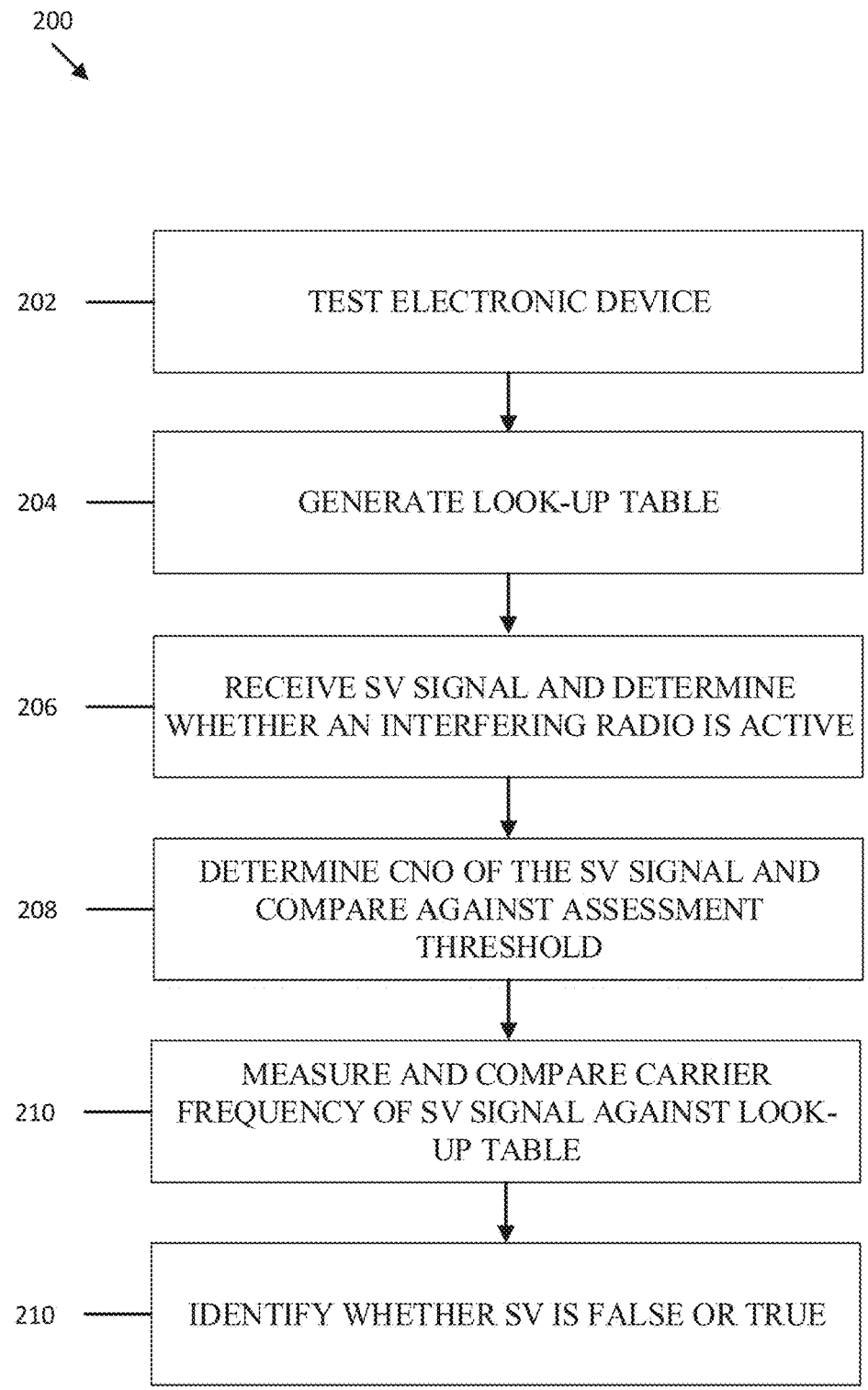
FIG. 2 is a flowchart for identifying false SVs, according to an embodiment.

FIG. 2 is a flowchart 200 for identifying false SVs, according to an embodiment. Referring to FIG. 2, a procedure for distinguishing true SVs from false SVs with a look-up table is described in flowchart 200.

At 202, an electronic device is tested. The electronic device may be tested during manufacture, during a product test phase, after a test phase, etc. The electronic device, as well as the particular model of the electronic device, may be tested to determine a frequency range associated with the carrier frequency of a true SV being tracked with respect to the electronic device.

At 204, a look-up table is generated. The look-up table may be populated with frequency ranges of false SVs corresponding to a number of different electronic device models. Alternatively, the look-up table may be populated with frequency ranges of true SVs determined to be associated with the particular electronic device model/type, although such a population may require additional storage space as the true SVs may be more numerous. The look-up table may be utilized in subsequent steps to determine whether an SV signal is true.

At 206, the electronic device receives an SV signal and determines whether an interfering radio is active. An interfering radio may include LTE band 13 (B13), LTE band 14 (B14), and/or other locally generated synchronous interference signals.

At 208, the carrier-to-noise density ratio (CNO) of the SV signal is determined and compared with an assessment threshold (T). The threshold T may be generated by simulation. The threshold T may be based on a probability of a false alarm versus a probability of detection. The CNO of the false SV may be based on the degree of coupling between an interferer and GNSS receiver. For example, interference 116 of FIG. 1 is the primary component related to the variation of the received false SV CNO. Other elements include transmit power of B14, etc. The CNO threshold is computed and the measurement may be based on the probability that a false SV track will have a CNO greater than this. The CNO threshold may be set based on experience with particular electronic devices. The CNO may be computed theoretically, although accuracy may vary due to analog nature of signal coupling within ASICs. The CNO threshold may be set differently for similar type electronic devices by starting all devices with a CNO threshold 20 dB-Hz. As the device is used, it may be monitored if false SVs are observed with a CNO greater than the threshold. If so, then the CNO threshold may be raised (to be just above largest observed false SV CNO). This type of algorithm also applies to filling the false SV frequency table, to allow additional table entries based on false SV observations as the device is used. The CNO of false SVs is typically low (e.g., about 14-20 dB-Hz), and as such, the threshold T may be set, initialized, calculated, etc., based on an expected CNO of a false SV. If the CNO of the SV is greater than the threshold T, then the electronic device may identify the SV as a true SV and proceed with the SV tracking.

At 210, if the CNO of the SV signal is less than or equal to the threshold T, then the carrier frequency of the SV signal is measured and compared with the look-up table generated at 204. The measured carrier frequency may be compared with carrier frequencies of true SVs determined to the particular model/type of the electronic device from the testing at 202. If the carrier frequency of the SV signal does not match carrier frequencies stored in the look-up table (i.e., if the look-up table stores values associated with carrier frequencies of false SVs), then the SV signal is identified as a true SV signal, and the SV continues to be tracked. Alternatively, if the look-up table stores carrier frequency values associated with true SVs, and the measured carrier frequency matches a value in the look-up table associated with the particular model/type of the electronic device, then the SV signal is identified as a true SV signal, and the SV continues to be tracked.

It is noted that 208 and 210 may be optional or partially optional. For example, the method may measure and compare the carrier frequency of the SV signal with the look-up table without any CNO determination (e.g., the method proceeds to look-up table comparison regardless of a CNO value or threshold comparison result.

At 212, if the measured carrier frequency of the SV matches a carrier frequency value associated with a false SV (or does not match any values associated with true SVs), then the SV may be identified as a false SV and the SV track may be dropped. Alternatively, the SV may be identified as a potential false SV, and the electronic device may continue to monitor the SV instead of dropping the track for further verification of the SV. The SV track may be monitored for a period of time (e.g., several seconds) to observe its carrier frequency motion with respect to the expected Doppler. If no carrier frequency motion is observed in the SV during the monitoring, then the SV likely does not include GNSS data. Thus, the SV may be identified as a false SV and then dropped. The look-up table allows rapid determination that the track may be a false SV, so the decision as to false SV can be no, yes and maybe. The maybe state prevents using the measurement in a navigation solution until false SV is determined to be "no". The carrier frequency scan/extended coherent integration method is used to finally decode yes/no for false SV.

Figure 3:
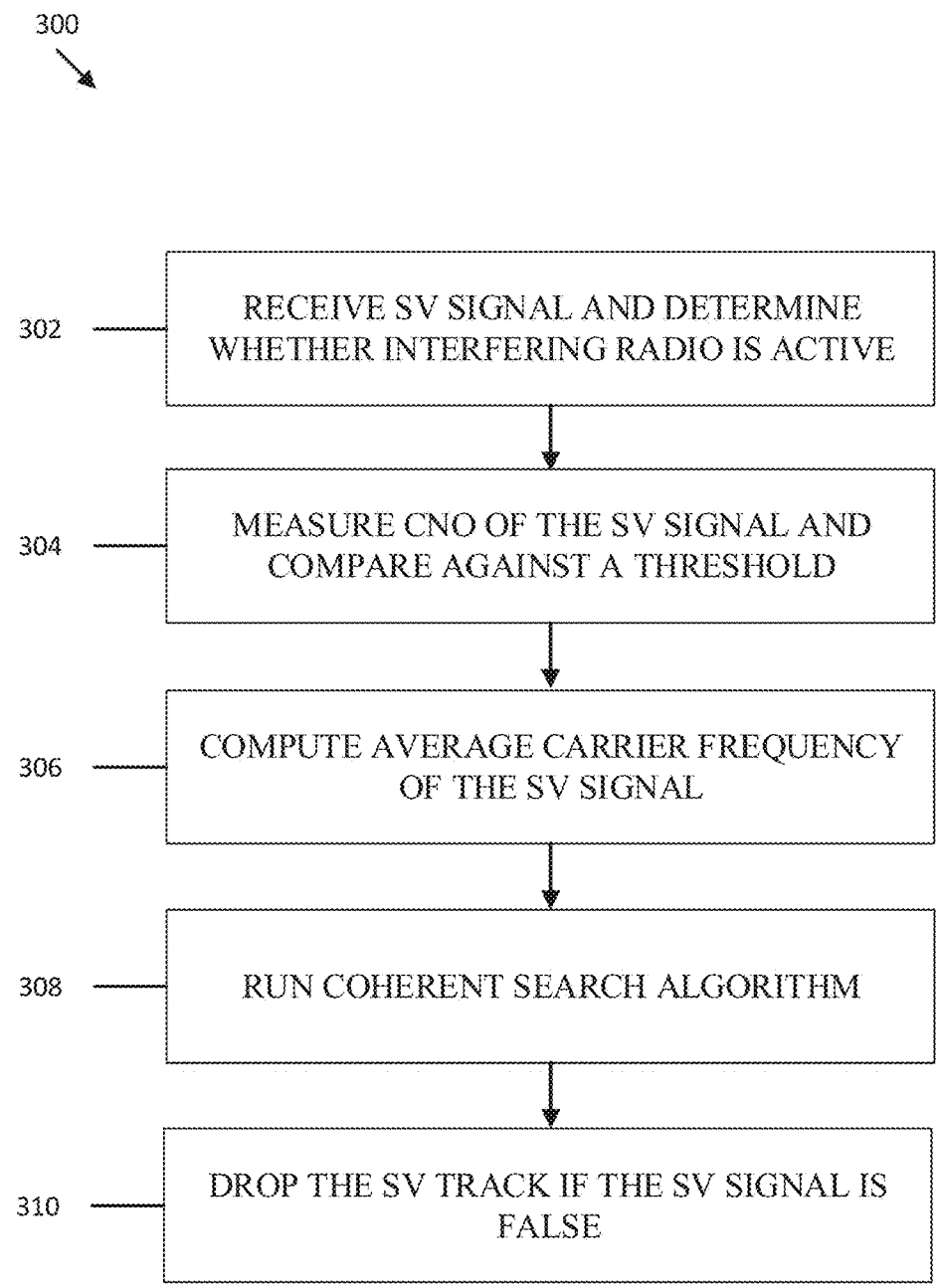
FIG. 3 is a flowchart for identifying false SVs, according to an embodiment.

FIG. 3 is a flowchart 300 for identifying false SVs, according to an embodiment. In flowchart 300, the presence of satellite data in an SV is evaluated to determine whether the SV is a true SV or a false SV.

At 302, the electronic device receives an SV signal and determines whether an interfering radio is active. An interfering radio may include B13, B14, and/or other locally generated synchronous interference signals.

At 304, if an interfering radio is active, the CNO of the SV signal is measured and compared with a threshold T. The threshold T may be generated by simulation. The threshold T may be based on a probability of a false alarm versus a probability of detection. For example, the CNO of false SVs is typically low (e.g., about 14-20 dB-Hz), and as such, the threshold T may be set, initialized, calculated, etc., based on an expected CNO of a false SV. If the CNO of the SV is greater than the threshold T, then the electronic device may identify the SV as a true SV and proceed with the SV tracking.

At 306, if the CNO of the SV signal is less than (or equal to) the threshold T, the average carrier frequency of the SV signal is computed, and at 308, a coherent search algorithm (CSA) is run. GPS L1 C/A code modulates with 50 Baud data. Galileo E1-B code modules with 250 Baud data. The GNSS pilot signals all use a secondary code (e.g., L1-C. data/pilot has effectively 100 Baud). The signal from the interfering radio source does not modulate with data (e.g., the signals do not typically include transmitted data). If coherent integration (e.g., the CSA) is performed over longer periods of time (e.g., 20 msec, 100 msec, 1 second, etc.), the coherent integration will continue to grow if the SV is false. If the SV is true (and no data stripping is done), the signal integration will diminish due to the presence of (random) data bits.

Alternatively, the CSA as described above may be run independently on each track to make determinations as to whether the SV track is true or false. In other words, the system may run 306 regardless of a CNO determination and threshold comparison. Therefore, 304 may be optional in some examples.

Figure 4:
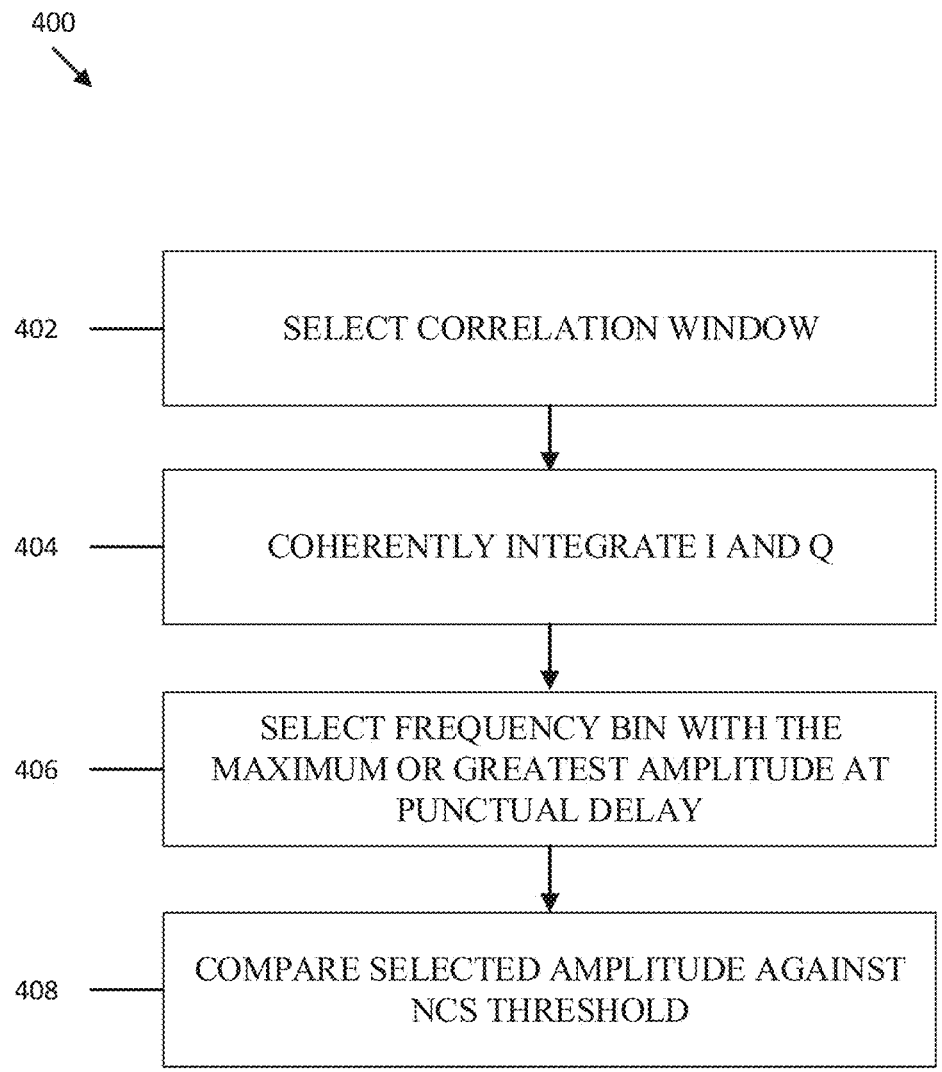
FIG. 4 is a flowchart for a CSA algorithm, according to an embodiment.

FIG. 4 is a flowchart 400 for a CSA algorithm, according to an embodiment. As noted above, the CNO of false SVs is typically low, and the automatic frequency control (AFC) carrier track of these signals typically have a variance of several Hz (measured each second).

At 402, a correlation window is selected. In order to coherently integrate for a longer period of time, a search space/correlation window is set (e.g., about +/−5 Hz), with the carrier searched in steps (e.g., 0.1 Hz). An example correlation window is $50*(I_{20\ msec}, Q_{20\ msec})*N$ taps, with 20 msec being the integration time length. Taps may refer to code phase offset delays between incoming SV and locally generated code alignment. With N taps, the correct code phase alignment is present in the window. Taps are typically ¼ chip apart from each other. This allows a maximum offset from the true alignment of $\frac{1}{8}^{th}$ of a chip. When one of the taps is close to the alignment peak, this may minimize CNO loss.

At 404, I and Q are coherently integrated across the desired data bits and time period (e.g., 20 msec). The frequency bins are fixed with respect to the crystal oscillator, such that the numerically controlled oscillator would use a fixed, but slightly different carrier frequency word for each bin.

At 406, the frequency bin with the maximum (or greatest) amplitude at punctual delay is selected. With no interference the punctual delay is the delay with best alignment, between local and SV spreading codes. The GNSS receiver typically uses early and late correlations to form a code loop discriminator, to drive early minus late to zero. Punctual may then represent being half way (in delay) between early and late. The code tracking loop is peak seeking, and it will seek the peak for true and false SVs (e.g., it doesn't distinguish).

At 408, the selected amplitude is compared with a noncoherent summation (NCS) threshold. For example, the NCS threshold may be an amplitude at punctual delay from a one second NCS summation, multiplied by a fixed value (a value chosen as a balance between probability of false detection versus probability of true detection). If the selected amplitude is greater than the NCS threshold, then the SV is false. If the selected amplitude is less than (or equal to) the NCS threshold, then the SV is true.

The longer coherent integration improves signal-to-noise ratio (SNR). NCS accumulation over 1 second has potentially 8.5 dB less SNR than a 1 second coherent summation, thereby improving the ability to distinguish false SVs from true SVs.

Referring back to flowchart 300 of FIG. 3, after the CSA is run, at 310, if the SV track is false, the SV track is dropped. Furthermore, the carrier frequency and the power of the false SV track may be stored to form a database (e.g., a look-up table) for future identification of false SV tracks.

The techniques disclosed above operate when assuming the signals have unknown, random data bits. However, when the data is known, the processes may be further improved. Data may be known because the bits are predicted or obtained from an external source and because the signal contains a secondary code pilot.

When the data is known, the coherent summation of the I and Q bits (e.g., at 404) can be arranged such that the GNSS signal sums to zero. For example, when a coherent summation is performed across two GPS L1 C/A code data bits (a total of 40 msecs of coherent integration), if the satellite transmits a "+1" for the first bit and a "−1" for the second bit, then the coherent sum will amount to zero for the two bits. Known signals may have repeated patterns such that the summation at 404 may be selected to produce a zero summation. For example, the GPS L1 C/A code preamble is "10001011" and a coherent summation across these bits leads to a zero signal. Furthermore, the Galileo E1-C pilot is 25-bits (0011100000001010110110010), which contains ten 1 s and fifteen 0 s. Each bit is 4 msecs, and the bits can be selected such that the integration would coherently sum over ten 1 s and ten 0 s.

Furthermore, false SV carrier lock points for the electronic device (as well as the particular model of the device) may be assessed. During pre-manufacture (e.g. during extensive testing searching for false lock points on many phone under many conditions, many modes of LTE transmission, etc.) the CSA algorithm is run to detect false SVs. A false SV has an associated carrier frequency. This carrier frequency is logged in a table along with other found false lock points. With enough testing the resulting table will contain most if not all of the possible false lock points for the device (or this type of device, same model). After the product ships, the carrier frequency that the receiver is locked to is compared with the closest table value and if less than a value threshold, (e.g. threshold=3 Hz) it might be a false SV. If the carrier frequency is greater than or exceeds the value threshold, it may be determined that the signal is a true SV. Thus, the systems, methods and devices may determine a false or true SV without determinations of the CNO or comparisons of the CNO with thresholds.

The higher the received CNO, the lower the probability of a false lock, to the extent that beyond some CNO value the probability of it being a false SV is essentially zero. Thus, using lock points may result in a fast way to reach an SV=true result. If CNO<threshold, other methods, such as those described above (e.g., CSA), may be utilized to determine SV=maybe, SV=false or SV=true.

Figure 5:
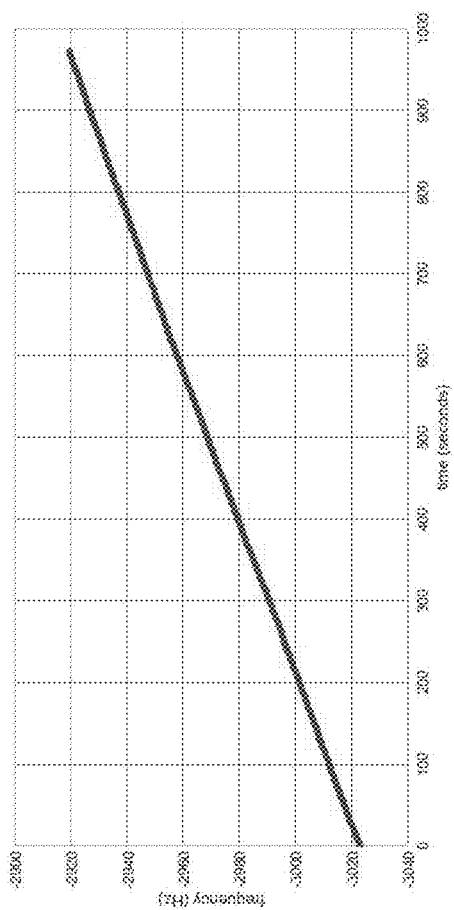
FIG. 5 is a graph depicting a carrier frequency of a true SV track, according to an embodiment.
Figure 6:
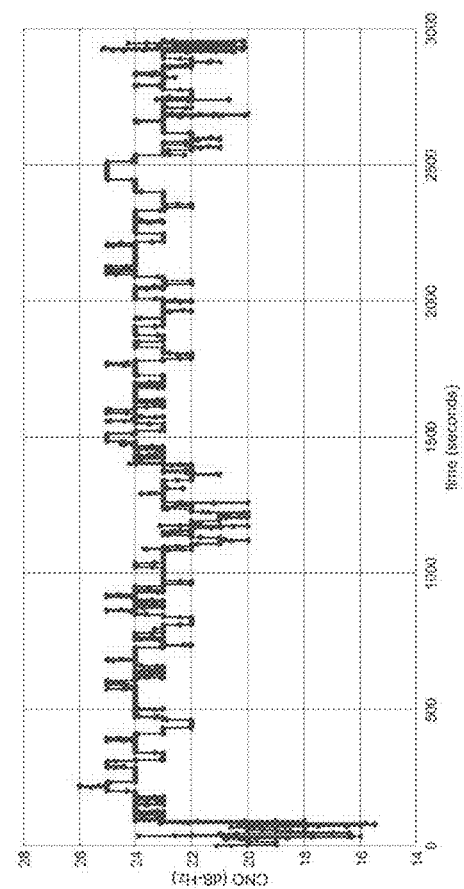
FIG. 6 is a graph depicting a CNO of a false SV track, according to an embodiment.

FIG. 5 is a graph 500 depicting a carrier frequency of a true SV track, according to an embodiment. FIG. 6 is a graph 600 depicting a CNO of a false SV track, according to an embodiment.

FIG. 7 is a graph 700 depicting an example carrier frequency of a false SV track, according to an embodiment. Graph 700 shows false SV track carrier frequencies at 702, 704 and 706. FIG. 8 is a graph 800 depicting an example false carrier frequency track over time.

FIG. 8 is a graph 800 depicting a B14 signal whole band RF capture, according to an embodiment.

Figure 9:
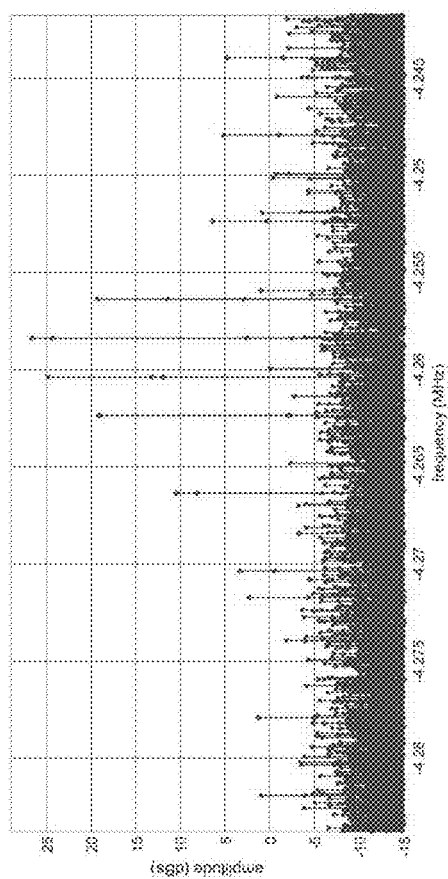
FIG. 9 is a graph depicting a B14 signal partial band RF capture, according to an embodiment.

FIG. 9 is a graph 900 depicting a B14 signal partial band RF capture, according to an embodiment. Graph 900 shows that the interferer is creating a set of spectral lines that have similar characteristics to a C/A code. The spectral lines can be traced back to characteristics of the B14 transmission, with nkHz offset between spectral lines, etc. In other words, the on/off switching of the B14 LTE packets cause a 1 msec repeated pattern.

Figure 10:
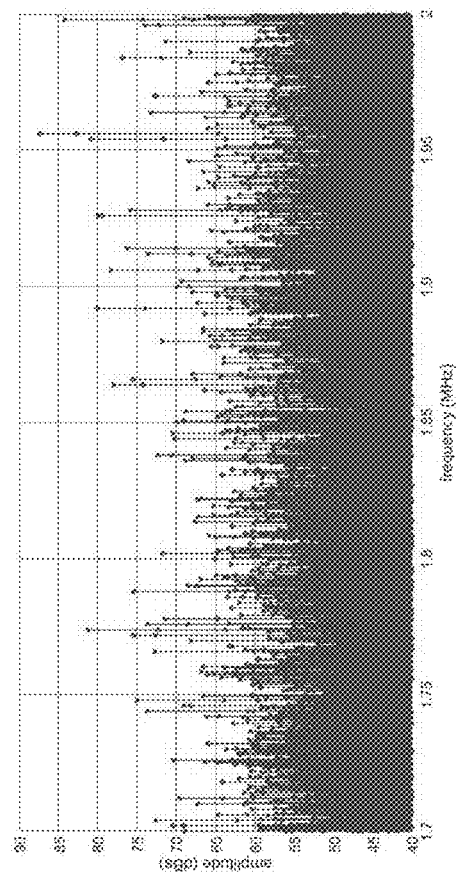
FIG. 10 is a graph depicting a B14 signal high noise band RF capture, according to an embodiment.

FIG. 10 is a graph 1000 depicting a B14 signal high noise band RF capture, according to an embodiment.

Figure 11:
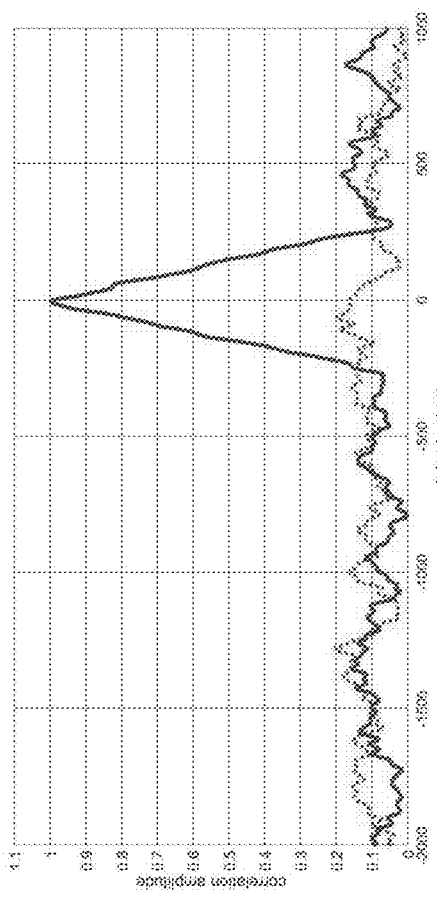
FIG. 11 is a graph depicting an example signal correlation, according to an embodiment.
Figure 12:
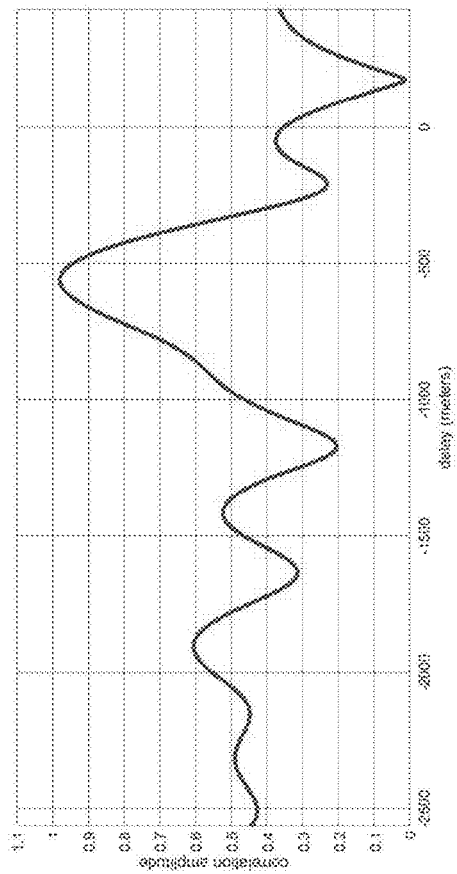
FIG. 12 is a graph depicting an example of interfering radio signals, according to an embodiment.

FIG. 11 is a graph 1100 depicting an example signal correlation, according to an embodiment. FIG. 12 is a graph 1200 depicting an example of interfering radio signals, according to an embodiment.

Figure 13:
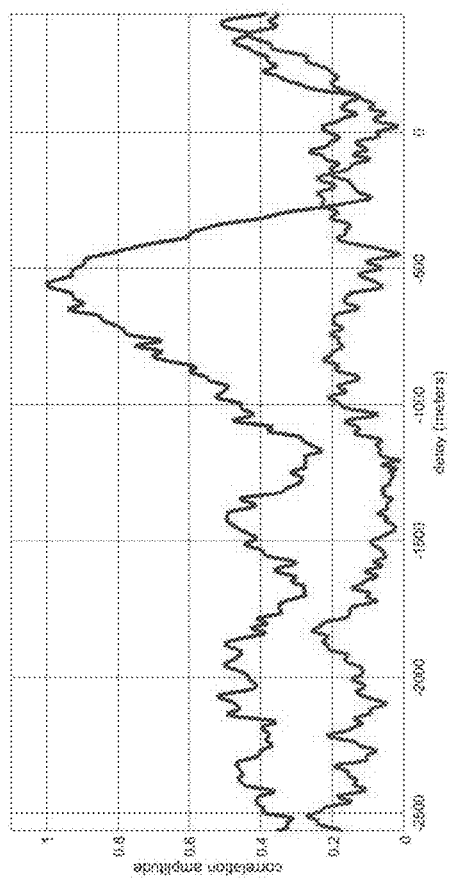
FIG. 13 is a graph depicting an example of interfering radio signals including noise, according to an embodiment.

FIG. 13 is a graph 1300 depicting an example of interfering radio signals including noise, according to an embodiment.

Figure 14:
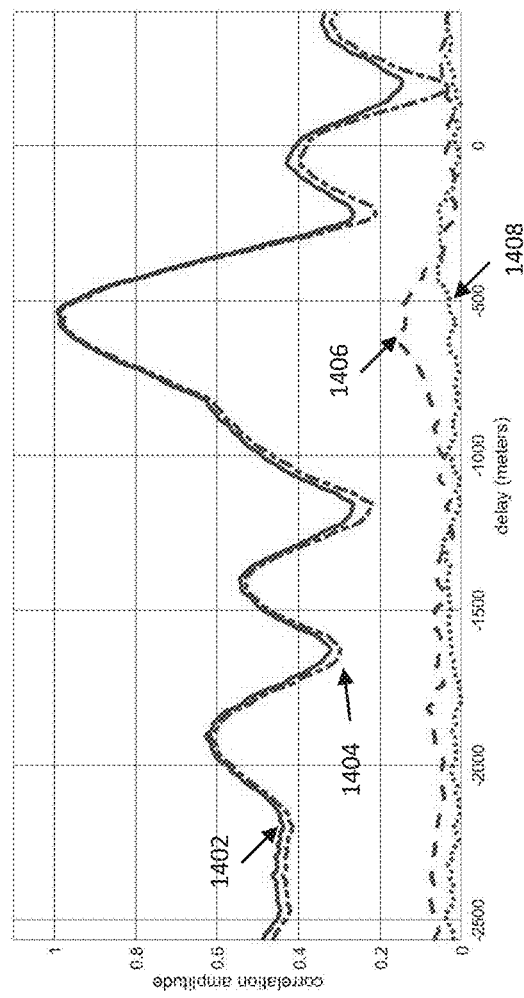
FIG. 14 is a graph of examples over one second integration, according to an embodiment.

FIG. 14 is a graph 1400 of examples over one second integration, according to an embodiment. Line 1402 shows an NCS 1 second false SV track. Line 1404 shows a 1 second coherent false SV track. Line 1406 shows a 1 second coherent true SV track. Line 1408 shows a 1 second coherent noise only track.

Figure 15:
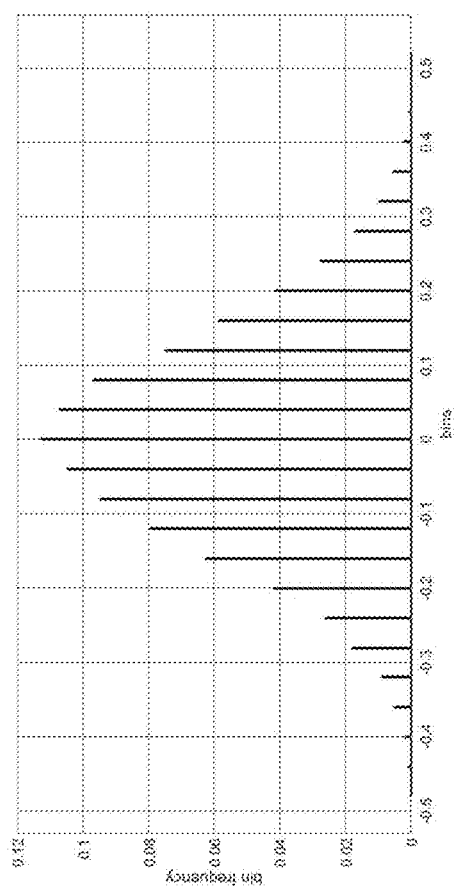
FIG. 15 is a graph of a histogram for random 50 bps, according to an embodiment.

FIG. 15 is a graph 1500 of a histogram for random 50 bps, according to an embodiment.

Figure 16:
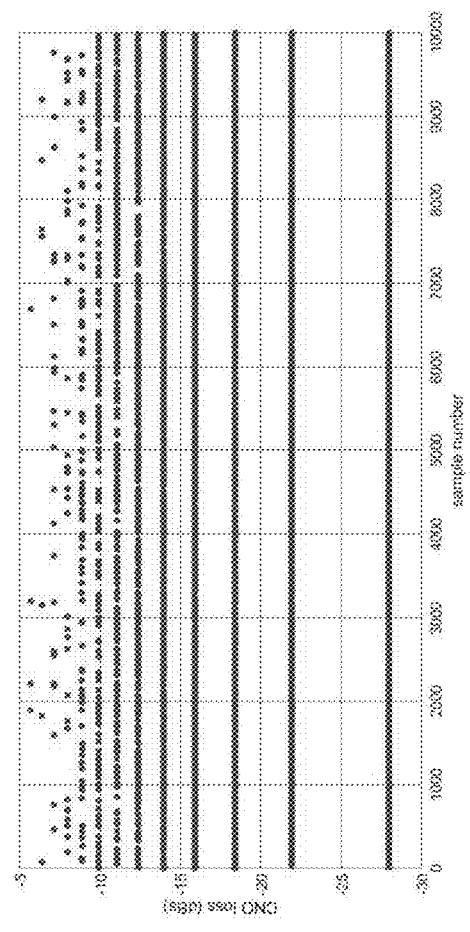
FIG. 16 is a graph of CNO loss with random data bits in 50 Baud, according to an embodiment.

FIG. 16 is a graph 1600 of CNO loss with random data bits in 50 Baud, according to an embodiment.

Figure 17:
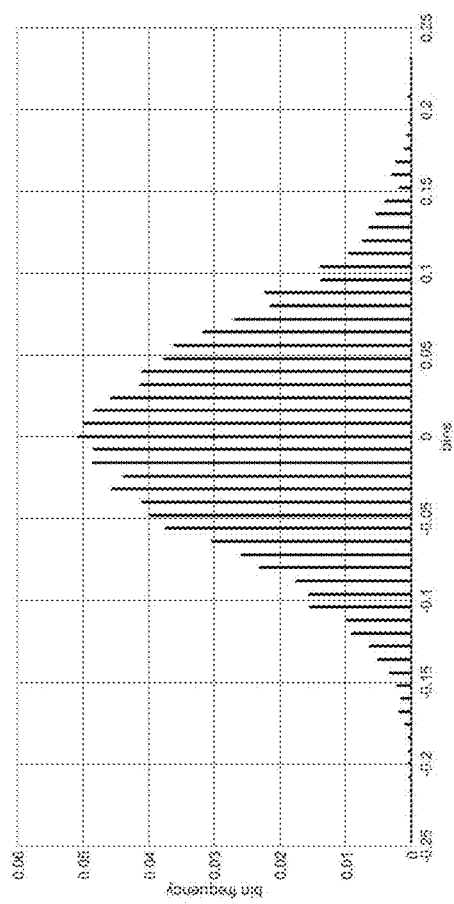
FIG. 17 is a graph of a histogram for random 250 bps, according to an embodiment.

FIG. 17 is a graph 1700 of a histogram for random 250 bps, according to an embodiment.

Figure 18:
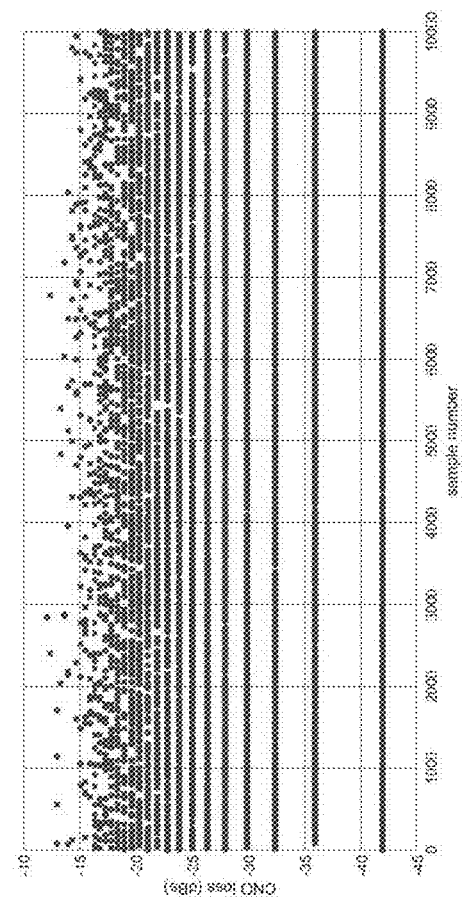
FIG. 18 is a graph of CNO loss with random data bits in 50 Baud, according to an embodiment.

FIG. 18 is a graph 1800 of CNO loss with random data bits in 50 Baud, according to an embodiment.

Figure 19:
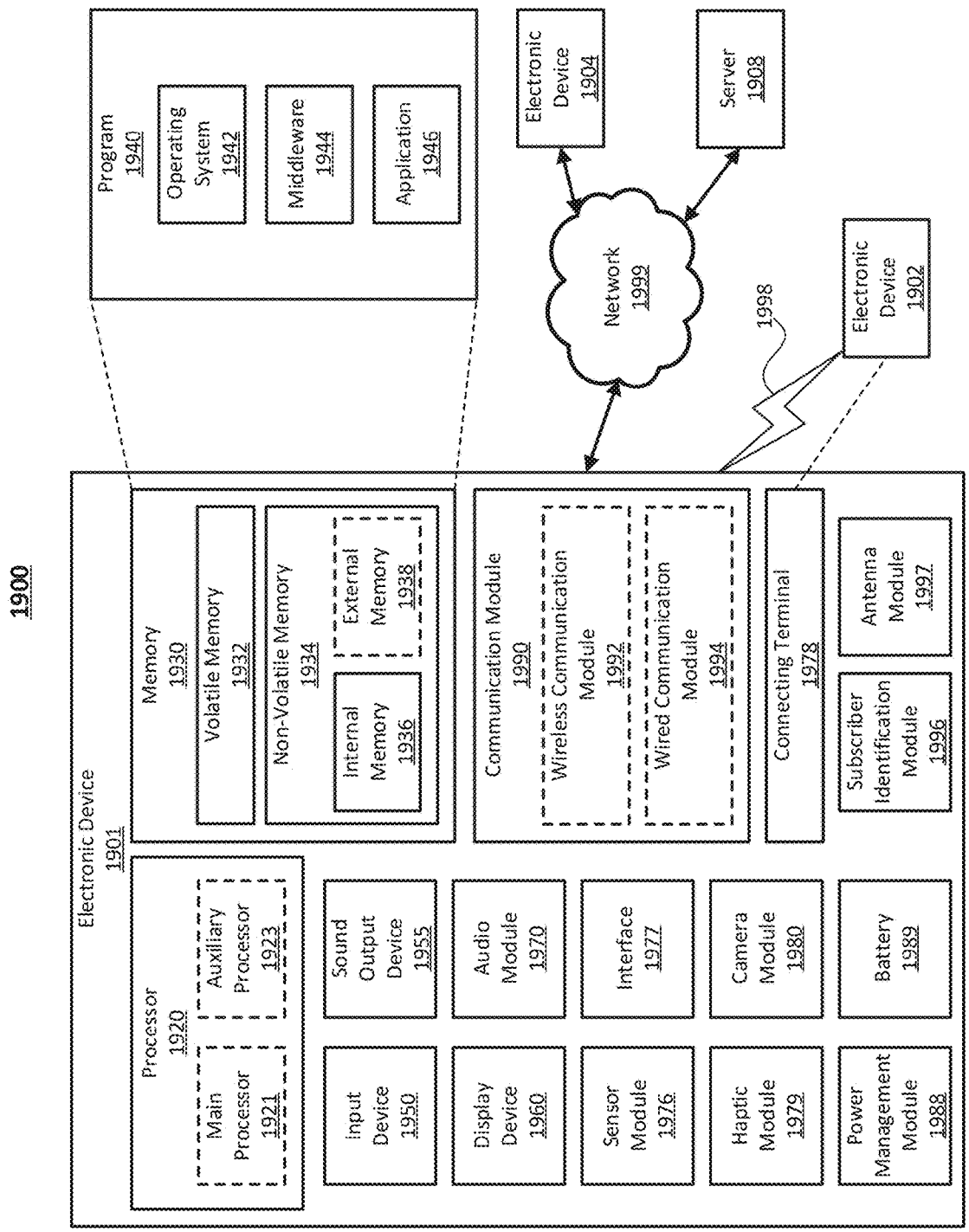
FIG. 19 is a block diagram of an electronic device in a network environment, according to one embodiment.

FIG. 19 is a block diagram of an electronic device 1901 in a network environment 1900, according to one embodiment. Referring to FIG. 19, the electronic device 1901 in the network environment 1900 may communicate with an electronic device 1902 via a first network 1998 (e.g., a short-range wireless communication network), or an electronic device 1904 or a server 1908 via a second network 1999 (e.g., a long-range wireless communication network). The electronic device 1901 may communicate with the electronic device 1904 via the server 1908. The electronic device 1901 may include a processor 1920, a memory 1930, an input device 1950, a sound output device 1955, a display device 1960, an audio module 1970, a sensor module 1976, an interface 1977, a haptic module 1979, a camera module 1980, a power management module 1988, a battery 1989, a communication module 1990, a subscriber identification module (SIM) 1996, or an antenna module 1997. In one embodiment, at least one (e.g., the display device 1960 or the camera module 1980) of the components may be omitted from the electronic device 1901, or one or more other components may be added to the electronic device 1901. In one embodiment, some of the components may be implemented as a single integrated circuit (IC). For example, the sensor module 1976 (e.g., a fingerprint sensor, an iris sensor, or an illuminance sensor) may be embedded in the display device 1960 (e.g., a display).

The processor 1920 may execute, for example, software (e.g., a program 1940) to control at least one other component (e.g., a hardware or a software component) of the electronic device 1901 coupled with the processor 1920, and may perform various data processing or computations. As at least part of the data processing or computations, the processor 1920 may load a command or data received from another component (e.g., the sensor module 1976 or the communication module 1990) in volatile memory 1932, process the command or the data stored in the volatile memory 1932, and store resulting data in non-volatile memory 1934. The processor 1920 may include a main processor 1921 (e.g., a central processing unit (CPU) or an application processor (AP)), and an auxiliary processor 1923 (e.g., a graphics processing unit (GPU), an image signal processor (ISP), a sensor hub processor, or a communication processor (CP)) that is operable independently from, or in conjunction with, the main processor 1921. Additionally or alternatively, the auxiliary processor 1923 may be adapted to consume less power than the main processor 1921, or execute a particular function. The auxiliary processor 1923 may be implemented as being separate from, or a part of, the main processor 1921.

The auxiliary processor 1923 may control at least some of the functions or states related to at least one component (e.g., the display device 1960, the sensor module 1976, or the communication module 1990) among the components of the electronic device 1901, instead of the main processor 1921 while the main processor 1921 is in an inactive (e.g., sleep) state, or together with the main processor 1921 while the main processor 1921 is in an active state (e.g., executing an application). According to one embodiment, the auxiliary processor 1923 (e.g., an image signal processor or a communication processor) may be implemented as part of another component (e.g., the camera module 1980 or the communication module 1990) functionally related to the auxiliary processor 1923.

The memory 1930 may store various data used by at least one component (e.g., the processor 1920 or the sensor module 1976) of the electronic device 1901. The various data may include, for example, software (e.g., the program 1940) and input data or output data for a command related thereto. The memory 1930 may include the volatile memory 1932 or the non-volatile memory 1934.

The program 1940 may be stored in the memory 1930 as software, and may include, for example, an operating system (OS) 1942, middleware 1944, or an application 1946.

The input device 1950 may receive a command or data to be used by other component (e.g., the processor 1920) of the electronic device 1901, from the outside (e.g., a user) of the electronic device 1901. The input device 1950 may include, for example, a microphone, a mouse, or a keyboard.

The sound output device 1955 may output sound signals to the outside of the electronic device 1901. The sound output device 1955 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1960 may visually provide information to the outside (e.g., a user) of the electronic device 1901. The display device 1960 may include, for example, a display, a hologram device, or a projector and control circuitry to control a corresponding one of the display, hologram device, and projector. According to one embodiment, the display device 1960 may include touch circuitry adapted to detect a touch, or sensor circuitry (e.g., a pressure sensor) adapted to measure the intensity of force incurred by the touch.

The audio module 1970 may convert a sound into an electrical signal and vice versa. According to one embodiment, the audio module 1970 may obtain the sound via the input device 1950, or output the sound via the sound output device 1955 or a headphone of an external electronic device 1902 directly (e.g., wiredly) or wirelessly coupled with the electronic device 1901.

The sensor module 1976 may detect an operational state (e.g., power or temperature) of the electronic device 1901 or an environmental state (e.g., a state of a user) external to the electronic device 1901, and then generate an electrical signal or data value corresponding to the detected state. The sensor module 1976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1977 may support one or more specified protocols to be used for the electronic device 1901 to be coupled with the external electronic device 1902 directly (e.g., wiredly) or wirelessly. According to one embodiment, the interface 1977 may include, for example, a high definition multimedia interface (HDMI), a universal serial bus (USB) interface, a secure digital (SD) card interface, or an audio interface.

A connecting terminal 1978 may include a connector via which the electronic device 1901 may be physically connected with the external electronic device 1902. According to one embodiment, the connecting terminal 1978 may include, for example, an HDMI connector, a USB connector, an SD card connector, or an audio connector (e.g., a headphone connector).

The haptic module 1979 may convert an electrical signal into a mechanical stimulus (e.g., a vibration or a movement) or an electrical stimulus which may be recognized by a user via tactile sensation or kinesthetic sensation. According to one embodiment, the haptic module 1979 may include, for example, a motor, a piezoelectric element, or an electrical stimulator.

The camera module 1980 may capture a still image or moving images. According to one embodiment, the camera module 1980 may include one or more lenses, image sensors, image signal processors, or flashes.

The power management module 1988 may manage power supplied to the electronic device 1901. The power management module 1988 may be implemented as at least part of, for example, a power management integrated circuit (PMIC).

The battery 1989 may supply power to at least one component of the electronic device 1901. According to one embodiment, the battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the electronic device 1902, the electronic device 1904, or the server 1908) and performing communication via the established communication channel. The communication module 1990 may include one or more communication processors that are operable independently from the processor 1920 (e.g., the AP) and supports a direct (e.g., wired) communication or a wireless communication. According to one embodiment, the communication module 1990 may include a wireless communication module 1992 (e.g., a cellular communication module, a short-range wireless communication module, or a global navigation satellite system (GNSS) communication module) or a wired communication module 1994 (e.g., a local area network (LAN) communication module or a power line communication (PLC) module). A corresponding one of these communication modules may communicate with the external electronic device via the first network 1998 (e.g., a short-range communication network, such as Bluetooth™, wireless-fidelity (Wi-Fi) direct, or a standard of the Infrared Data Association (IrDA)) or the second network 1999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1992 may identify and authenticate the electronic device 1901 in a communication network, such as the first network 1998 or the second network 1999, using subscriber information (e.g., international mobile subscriber identity (IMSI)) stored in the subscriber identification module 1996.

The antenna module 1997 may transmit or receive a signal or power to or from the outside (e.g., the external electronic device) of the electronic device 1901. According to one embodiment, the antenna module 1997 may include one or more antennas, and, therefrom, at least one antenna appropriate for a communication scheme used in the communication network, such as the first network 1998 or the second network 1999, may be selected, for example, by the communication module 1990 (e.g., the wireless communication module 1992). The signal or the power may then be transmitted or received between the communication module 1990 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1901 and the external electronic device 1904 via the server 1908 coupled with the second network 1999. Each of the electronic devices 1902 and 1904 may be a device of a same type as, or a different type, from the electronic device 1901. All or some of operations to be executed at the electronic device 1901 may be executed at one or more of the external electronic devices 1902, 1904, or 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1901. The electronic device 1901 may provide the outcome, with or without further processing of the outcome, as at least part of a reply to the request. To that end, a cloud computing, distributed computing, or client-server computing technology may be used, for example.

One embodiment may be implemented as software (e.g., the program 1940) including one or more instructions that are stored in a storage medium (e.g., internal memory 1936 or external memory 1938) that is readable by a machine (e.g., the electronic device 1901). For example, a processor of the electronic device 1901 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An electronic device for global navigation satellite system (GNSS), comprising:
   an antenna configured to receive a satellite vehicle (SV) signal; and
   a processor configured to:
      determine a carrier-to-noise density ratio (CNO) of the SV signal;
      compare the determined CNO of the SV signal with a threshold; and
      identify whether the SV signal is a true SV signal or a false SV signal, when the determined CNO is less than the threshold, by running a coherent search algorithm (CSA),
   wherein the CSA includes:
      coherently integrating a carrier frequency of the SV signal;
      selecting a frequency bin with a greatest magnitude from among a plurality of frequency bins of the coherently integrated carrier frequency of the SV signal; and
      comparing the magnitude of the selected frequency bin with a non-coherent summation (NCS) threshold.

2. The electronic device of claim 1, wherein the processor is further configured to identify whether the SV signal is a true SV signal or a false SV signal by:
   determining a carrier frequency of the SV signal; and
   comparing the determined carder frequency with a look-up table.

3. The electronic device of claim 2, wherein the look-up table includes values associated with carrier frequencies of false SV signals for a model or type of the electronic device, and wherein the SV signal is determined to be a false SV signal when the carrier frequency of the SV signal matches a value in the look-up table.

4. The electronic device of claim 3, wherein the processor is further configured to monitor the determined fake SV signal to verify that the SV signal is false.

5. The electronic device of claim 1, wherein the NCS threshold is determined based on an amplitude at punctual delay of an NCS summation multiplied by a predetermined constant.

6. A method for global navigation satellite system (GNSS), comprising:
   receiving a satellite vehicle (SV) signal by an antenna;
   determining an average carrier frequency of the SV signal; and
   identifying whether the SV signal is a true SV signal or a false SV signal by running a coherent search algorithm (CSA),
   wherein running the CSA includes coherently integrating the average carrier frequency of the SV signal, selecting a frequency bin with a greatest magnitude from among a plurality of frequency bins of the coherently integrated carrier frequency of the SV signal, and comparing a magnitude of the selected frequency bin with a non-coherent summation (NCS) threshold, and
   wherein the NCS threshold is determined based on an amplitude at punctual delay of an NCS summation multiplied by a predetermined constant.

7. The method of claim 6, further comprising determining the SV signal is a false SV signal when the coherent integration of the average carrier frequency grows over a predetermined period of time.

8. The method of claim 7, further comprising monitoring the determined false SV signal to verify that the SV signal is false.

9. The method of claim 6, further comprising determining the SV signal is a true SV signal when the coherent integration of the average carrier frequency diminishes over a predetermined period of time.

10. The method of claim 6, further comprising identifying whether interfering radios are active when the SV signal is received.

* * * * *